United States Patent
Sahu

(10) Patent No.: US 10,511,651 B2
(45) Date of Patent: Dec. 17, 2019

(54) INFINITE MICRO-SERVICES ARCHITECTURE

(71) Applicant: General Electric Company, Schenectady, NY (US)

(72) Inventor: Akshay Sahu, Edmonton (CA)

(73) Assignee: General Electric Company, Schenectady, NY (US)

(*) Notice: Subject to any disclaimer, the term of this patent is extended or adjusted under 35 U.S.C. 154(b) by 96 days.

(21) Appl. No.: 15/496,101

(22) Filed: Apr. 25, 2017

(65) Prior Publication Data

US 2018/0309802 A1 Oct. 25, 2018

(51) Int. Cl.
*H04L 29/08* (2006.01)
*H04L 29/12* (2006.01)

(52) U.S. Cl.
CPC ............ *H04L 67/02* (2013.01); *H04L 61/106* (2013.01)

(58) Field of Classification Search
CPC ............................. H04L 65/1073; H04L 61/20
See application file for complete search history.

(56) References Cited

U.S. PATENT DOCUMENTS

| | | | | |
|---|---|---|---|---|
| 8,230,050 | B1* | 7/2012 | Brandwine | H04L 45/586 709/220 |
| 9,524,167 | B1* | 12/2016 | Cohn | G06F 9/30098 |
| 10,013,550 | B1* | 7/2018 | Ahuja | H04L 67/1008 |
| 2010/0299437 | A1* | 11/2010 | Moore | H04L 67/1008 709/226 |
| 2012/0185506 | A1* | 7/2012 | Gomez Maturana | H04L 67/10 707/769 |
| 2016/0182473 | A1* | 6/2016 | Cignetti | H04L 63/0428 713/171 |
| 2017/0235950 | A1* | 8/2017 | Gopalapura Venkatesh | G06F 8/65 726/24 |
| 2017/0244593 | A1* | 8/2017 | Rangasamy | H04L 41/0654 |
| 2017/0329588 | A1* | 11/2017 | Lundberg | G06F 8/60 |
| 2018/0034924 | A1* | 2/2018 | Horwood | H04L 67/40 |
| 2018/0041515 | A1* | 2/2018 | Gupta | H04L 63/102 |
| 2018/0113707 | A1* | 4/2018 | Mora Lopez | G06F 9/223 |
| 2018/0113790 | A1* | 4/2018 | Chunduri | G06F 11/3664 |
| 2018/0115635 | A1* | 4/2018 | Ahuja | H04L 69/166 |
| 2018/0121221 | A1* | 5/2018 | Ahuja | G06F 9/45558 |
| 2018/0146068 | A1* | 5/2018 | Johnston | H04L 12/4641 |
| 2018/0152534 | A1* | 5/2018 | Kristiansson | H04L 67/16 |
| 2018/0160153 | A1* | 6/2018 | Rajewski | H04N 21/2187 |
| 2018/0270125 | A1* | 9/2018 | Jain | H04L 41/5041 |
| 2018/0307524 | A1* | 10/2018 | Vyas | G06F 9/45558 |
| 2018/0331905 | A1* | 11/2018 | Toledo | H04L 41/0816 |

* cited by examiner

*Primary Examiner* — Jerry B Dennison
(74) *Attorney, Agent, or Firm* — Fitch Even Tabin & Flannery LLP

(57) ABSTRACT

A plurality of micro-services is automatically registered with a central data storage device. During registration, a mapping is determined between intermediate identifiers that identify selected micro-services and physical addresses of one or more servers that execute the selected micro-services. At least one of the physical addresses are dynamically updated based upon operational changes to the one or more servers or based upon a registration of an additional server.

6 Claims, 5 Drawing Sheets

INFINITE MICRO-SERVICES ARCHITECTURE

BACKGROUND OF THE INVENTION

Field of the Invention

The subject matter disclosed herein generally relates micro-services and, more specifically, to accessing and executing these micro-services.

Brief Description of the Related Art

Computing systems utilize micro-services to, among other things, process and display information to users. In aspects, a micro-service is a component (e.g., a component written in software) that performs a single unit of work. The unit of work may be defined as the accomplishment of a work function. For example, micro-services can be used within a web page to display price, display suppliers, or display product ratings, to mention a few examples. Other example of micro-services include micro-services for validation of code (e.g., determine if there are viruses in the code), micro-services that provide user authentication, and micro-services that provide for classification of data.

Micro-services can be executed as layers, by calling (or executing) other micro-services. Micro-services, however, are not independently aware of the physical addresses of the dependent micro-services. In-order for one micro-service to call another micro-service, the calling micro-service requires knowledge of the physical address of the called micro-services. In other words, the addresses were static and the code of the calling micro-service was embedded with the physical address of the called micro-service.

This type of architecture created various problems. If the physical addresses of the called micro-service changed, then calling micro-service would need to be reconfigured and re-deployed. In another problem, if a first server that executed a micro-service went down or otherwise failed, there was no possibility a second server could be utilized to execute the micro-service since the address of the server could not be changed. Registrations of micro-services were manual and required resolution of all the micro-services present in the ecosystem.

All of these problems resulted in some user dissatisfaction with previous approaches.

BRIEF DESCRIPTION OF THE INVENTION

The present invention is directed to a micro-service architecture that automates the process of registration and resolution, and makes all the micro-services independent of each other thereby improving the availability and scalability of the system. Intermediate identifiers are utilized by calling micro-services to execute or access called micro-services. In aspects, these intermediate identifiers are linked to the actual physical addresses required to execute the called micro-services. Consequently, changes to the addresses of the called micro-service do not require the reconfiguration and redeployment of the calling micro-service. Both micro-service registration and address resolution are automatic, requiring no manual intervention by users.

In the present approaches, micro-services are loosely coupled together. Any application adapting to this architecture can always remain highly distributed. Advantageously, micro-services are self-registering and require no manual intervention or interaction in their management. In another benefit, since micro-services are self-resolving, any application adapting to this architecture will always be highly available. Intermediate identifiers referring to micro-services can be linked to multiple physical addresses, thereby intrinsically making the present approaches highly scalable. New micro-services can be brought up on-line and utilized, without ceasing operation of already-existing micro-services, thus hiding infrastructure changes to customers.

In many of these embodiments, a plurality of micro-services gets automatically registered with a central data storage device. During registration, a mapping is determined between intermediate identifiers that identify selected micro-services and physical addresses of one or more servers that execute the selected micro-services. Any of the physical address is dynamically updated based upon operational changes to the servers or based upon a registration of an additional server.

In some aspects, the plurality of micro-services include a first micro-service and a second micro-service. The first micro-service is executed and programmatically calls the second micro-service. The first micro-service accesses the second micro-service via an intermediate identifier that identifies the second micro-service.

The mapping is accessed and a physical address of a server that executes the second micro-service is obtained using the intermediate identifier. The second micro-service is then called by utilizing the physical address obtained from the mapping.

In some examples, the physical addresses are URLs. In other examples, the registration further includes mapping each of the intermediate identifiers to one or more pieces of information including an HTTP method, an input consumption by a selected micro-service, an output production by a selected micro-service, or a version number. In yet other examples, each of the intermediate identifiers is a name and namespace combination.

In other aspects, the mapping is between a first selected intermediate identifier and a first plurality of physical addresses. In some examples, the first plurality of physical addresses are arranged and selected according to a prioritization. In further examples, the prioritization can be changed dynamically, to balance the load on the servers, by utilizing anyone of the scheduling algorithms such as (Round-Robin, Weighted Round Robin, Priority Scheduling, C-Scan, C-Look).

In others of these embodiments, a system includes a central data storage device, and a plurality of servers. The plurality of servers executes a plurality of micro-services. Each of the servers executes a selected one of the plurality of micro-services, and the plurality of servers is coupled to the central data storage device.

Each of the plurality of micro-services registers with the central data storage device by determining a mapping between intermediate identifiers that identify selected ones of the micro-services and physical addresses of the servers. Physical addresses can be dynamically updated based upon operational changes to the servers or based upon registration of an additional server.

In other aspects, the plurality of micro-services includes a first micro-service and a second micro-service. A customer device requests execution of the first micro-service. The first micro-service programmatically calls the second micro-service, and the first micro-service accesses the second micro-service via a first intermediate identifier that identifies the second micro-service. The first micro-service accesses the mapping and obtains a physical address of a server that executes the second micro-service using the first intermediate identifier. The customer device causes execution of the second micro-service by utilizing the physical address obtained from the mapping.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

In one example of the approaches described herein, each micro-service hosts a set of operations for clients to consume. For each operation, all the information is fetched and registered in a data storage device. At the data storage device, any registered micro-service (or micro-service operation) is recognized by a unique intermediate identifier (e.g., a combination of name and namespace as described elsewhere herein). The storage device stores meta-information of micro-services or operations (e.g., physical address of a server where the micro-service or operation is executed, an HTTP method used, inputs consumed by the micro-service or operation, outputs produced by the micro-service or operation, and a version number of the micro-service or operation).

Any other micro-service, dependent or calling another micro-service (or operation), accesses the storage device with the unique intermediate identifier (e.g., name and namespace) associated with the other micro-service (or operation). The storage device returns the latest details of the micro-service (or operations) that are registered with the unique intermediate identifier (e.g., the combination of name and namespace). Thus, inter micro-service communication and calling between micro-services can be established and performed without hard-linking to actual physical addresses (e.g., coding an actual physical address of another micro-service into the code of a base micro-service).

Figure 1:
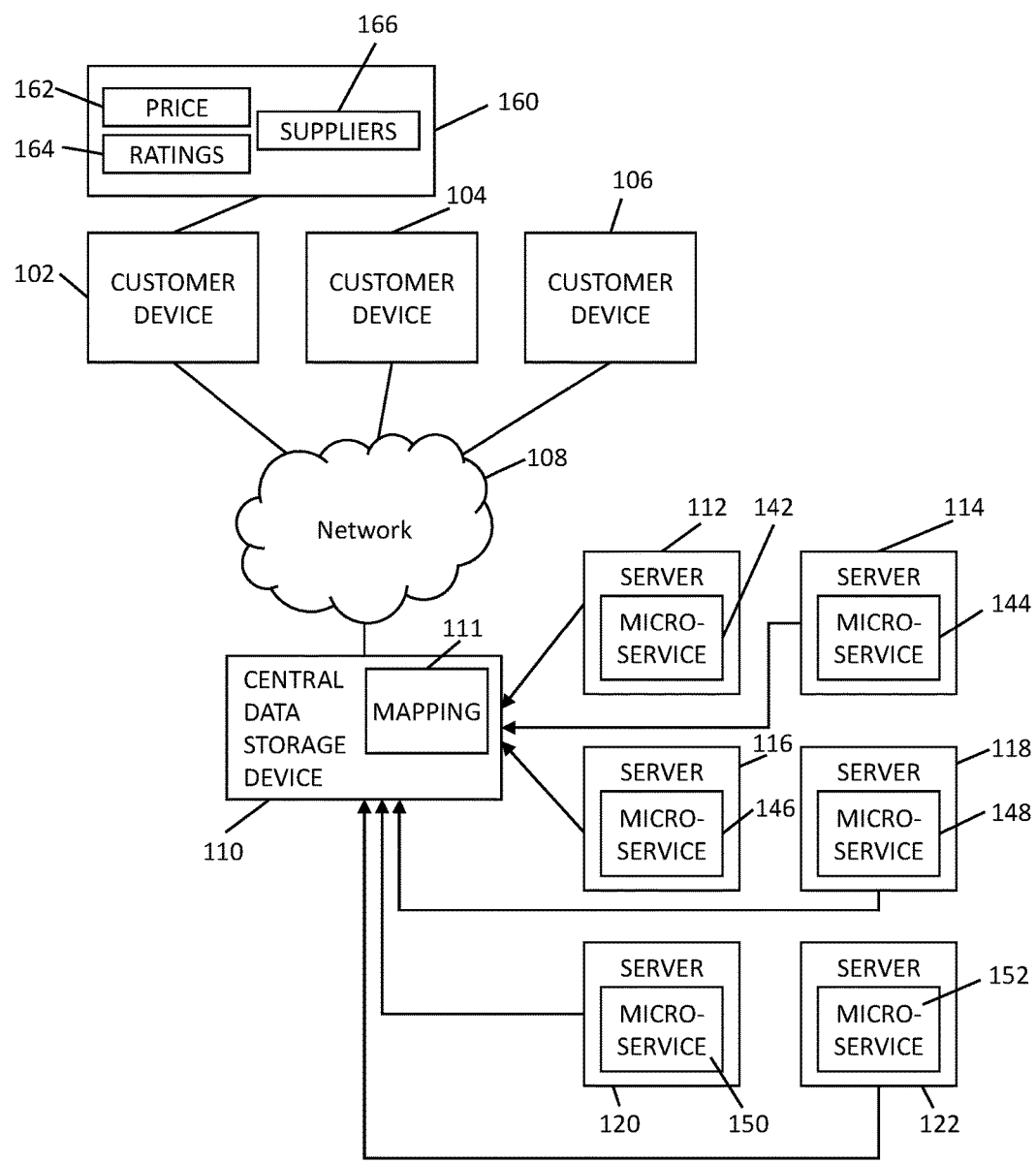
FIG. 1 comprises a block diagram of a system for micro-service registration and resolution according to various embodiments of the present invention.

Referring now to FIG. 1, one example of a system 100 for micro-service registration and resolution is described. The system 100 includes a first customer device 102, a second customer device 104, a third customer device 106, a network 108, a central data storage device 110, and servers 112, 114, 116, 118, 120, and 122 (that execute micro-services 142, 144, 146, 148, 150, and 152).

The first customer device 102, second customer device 104, and third customer device 106 may be any type of electronic device such as a cellular phone, smartphone, personal computer, laptop, or tablet to mention a few examples. These devices may include display screens, where information can be rendered to users. Other examples are possible.

The first customer device 102 displays a screen 160 including hyperlinks 162 (representing price), 164 (representing a rating), and 166 (representing a supplier that furnishes the product associated with the screen 160). Selection of the hyperlinks (e.g., by a user clicking a computer mouse) causes one or more of the micro-services 142, 144, 146, 148, 150, and 152 to be executed. The micro-services 142, 144, 146, 148, 150, and 152 may call each other.

The network 108 may be any network or combination of networks. In examples, the network 108 may be the cloud, the internet, cellular networks, local or wide area networks, or any combination of these (or other) networks. The network 108 may include various electronic devices (e.g., routers, gateways, and/or processors to mention a few examples).

The central data storage device 110 is any type of data storage device such as a read only memory, random access memory, flash memory, or mass storage memory to mention a few examples. Other examples are possible.

The central data storage unit 110 includes a mapping 111. The mapping 111 maps an intermediate identifiers associated with micro-services to physical addresses (e.g., a URLs). The intermediate identifiers can also be mapped to other information such as HTTP methods, inputs received or consumed by selected micro-services, outputs produced or created by selected micro-services, or a version numbers. The mapping 111 may be formed as any type of data structure such as a table or linked list. Other examples are possible.

It will be understood that the information in the mapping 111 may be changed based on various triggering events. For example, a physical event (e.g., an earthquake) or an event within the system 100 (e.g., a server becomes deactivated or otherwise goes off-line, or a new server is registered) cause changes to the mapping 111. The occurrence of these events may create a message that is received at the central data storage unit 110 to automatically (without human intervention) change elements in the mapping (e.g., change an address, remove an address, or re-prioritize multiple addresses when an intermediate identifier maps to multiple physical addresses, which are prioritized).

In examples, URLs (are other addresses) in the mapping are dynamically changed. In other examples, an intermediate identifier points to a plurality of URLs (URL1, URL2, URL3), which are organized in priority order (URL1 is first priority, URL3 is second priority, and URL2 is third priority). In one example, the occurrence of an event automatically changes the priority of URL1 from first to third and advances the priorities of the other URLs in a round-robin approach. Other examples are possible.

The servers (or container) 112, 114, 116, 118, 120, and 122 are devices that are configured to execute the micro-services 142, 144, 146, 148, 150, and 152. The servers 112, 114, 116, 118, 120, and 122 may each have a dedicated memory or have access to a memory. The servers 112, 114, 116, 118, 120, and 122 may include a control circuit or processing device (e.g., a microprocessor) that executes the micro-services 142, 144, 146, 148, 150, and 152 (which may be implemented as computer instructions).

The micro-services 142, 144, 146, 148, 150, and 152 are components (e.g., components written in software) that each perform a single unit of work. The unit of work may be defined as the accomplishment of a work function. For example, micro-services 142, 144, 146, 148, 150, and 152 can be used at or within a web page context to display price, display suppliers, or display product ratings, to mention a few examples. Other example of micro-services include micro-services that perform code validation (e.g., determine if there are viruses in the code), micro-services that provide user authentication, and micro-services that provide for classification of data.

The intermediate identifier may be a combination of a namespace and a name. A namespace is a set of symbols or names that are used to organize items. A name may be included in the namespace. In the context of micro-services, "authentication" may be seen as a namespace (N1), and two types of authentication (S1 and S2) may be included in N1. Thus, N1.S1 and N1. S2 define particular micro-services that each perform specific types of authentication.

Users at the first customer device 102, second customer device 104, or third customer device 106 may utilize, execute, or call the micro-services 142, 144, 146, 148, 150, and 152. In one example, when a user clicks a link to render information on a web page, one or more of the micro-services 142, 144, 146, 148, 150, and 152 are called. These are executed as described elsewhere herein.

In one example of the operation of the system of FIG. 1, micro-services 142, 144, 146, 148, 150, and 152 are automatically registered with the central data storage device 110. During registration, the mapping 111 is determined between intermediate identifiers that identify selected micro-services 142, 144, 146, 148, 150, and 152 and physical addresses of one or more servers that execute the selected micro-services 142, 144, 146, 148, 150, and 152. In one example of the operation of the system of FIG. 1, at least one of the physical addresses is dynamically updated based upon operational changes to the one or more servers or based upon a registration of an additional server.

In one example, micro-service 142 is executed and programmatically calls the micro-service 144. The first micro-service 142 accesses the second micro-service 144 via a first intermediate identifier that identifies the second micro-service 144.

Thus, the code used in calling micro-services does not need to be changed when the physical address of a called micro-service changes or becomes inoperative. Consequently, operation changes to micro-services (and changes to the addresses of servers that execute these micro-services) can be quickly made, and do not require physically changing the computer code that implements a given micro-service.

Figure 2:
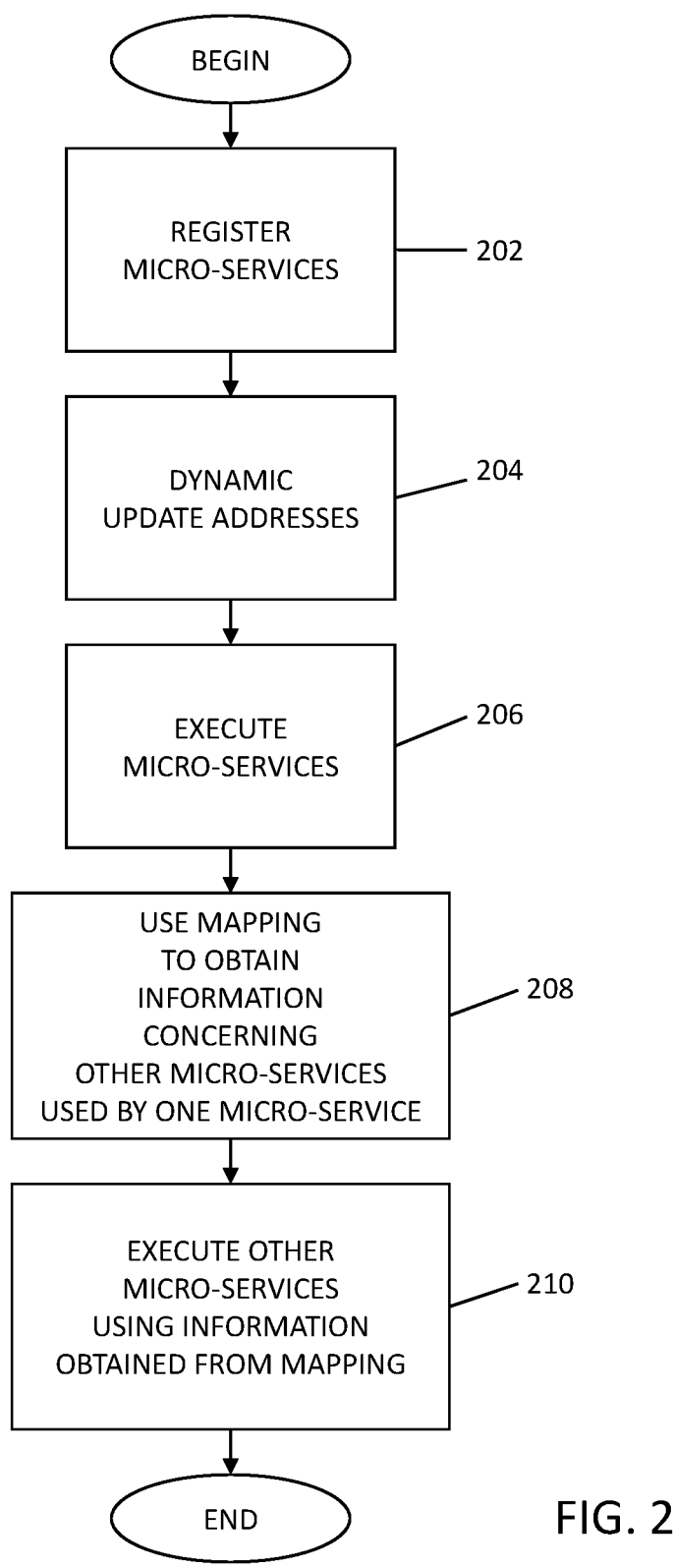
FIG. 2 comprises a flowchart of an approach for micro-service registration and resolution according to various embodiments of the present invention.

Referring now to FIG. 2, one example of an approach for micro-service registration and resolution is described. At step 202, a plurality of micro-services are automatically registered with a central data storage device. During registration, a mapping is determined between intermediate identifiers that identify or are associated with selected micro-services, and physical addresses of one or more servers that execute the selected micro-services. The mapping may be any type of data structure such as a look-up table. Other types of data structures for the mapping are possible.

At step 204, at least one of the physical addresses is dynamically updated based upon operational changes to the one or more servers or based upon a registration of an additional server. In one example, a micro-service becomes inoperative. In another example, a new micro-service is added.

In some aspects, the plurality of micro-services include a first micro-service and a second micro-service. At step 206, the first micro-service is executed and this first micro-service programmatically calls the second micro-service. The first micro-service accesses the second micro-service via a first intermediate identifier that identifies the second micro-service.

At step 208, the mapping is accessed and a physical address of a server that executes the second micro-service is obtained using the first intermediate identifier. For example, the first identifier is used as an index and the mapping is examined to find the first intermediate identifier (within the mapping). Once the first intermediate identifier is located in the mapping, then the physical addresses of the server executing the second micro-service (and possibly other information) is obtained.

In one specific example, a look-up table may be used to implement the mapping where an identifier (associated with the second micro-service) points to the physical address of the server that executes the second micro-service. Once the identifier is found in the table, the physical address is retrieved and the second micro-service is executed using the physical address of the second server.

At step 210, the second micro-service is executed by utilizing the physical address obtained from the mapping. In one example, the physical address is a URL and this is used to execute the second micro-service.

Figure 3:
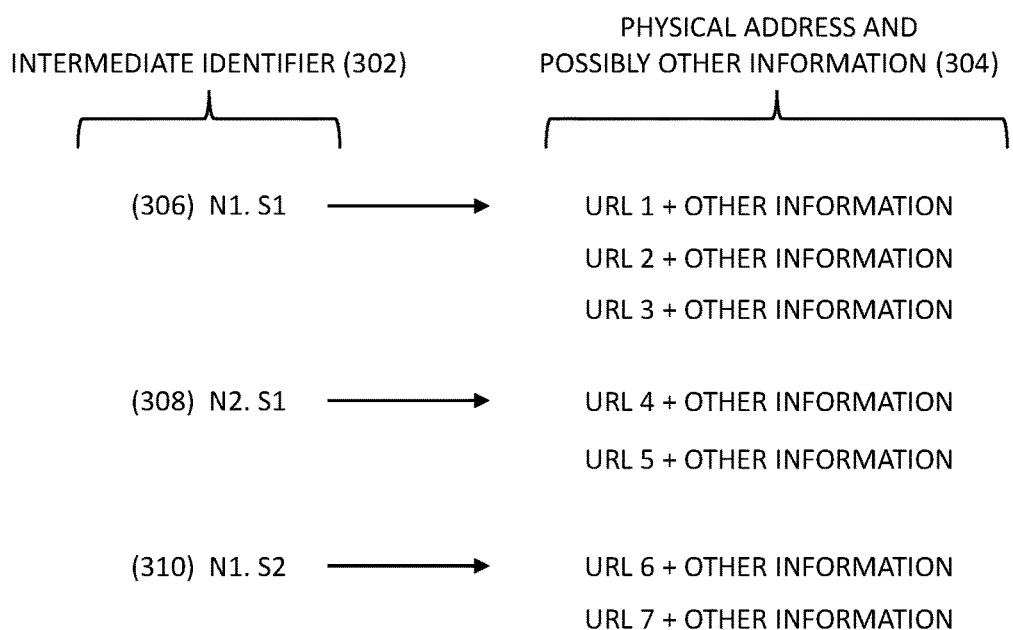
FIG. 3 comprises a block diagram of a mapping structure according to various embodiments of the present invention.

Referring now to FIG. 3, one example of a mapping structure 300 is described. This structure 300 is organized as a matrix with rows and columns. Other examples of mapping structures are possible.

In this example the mapping structure 300 has an intermediate identifier column 302 and a physical address column 304. The physical address column 304 may include other information.

A first row 306 includes identifier N1.S1, which points to three URLs (URL1, URL2, and URL3). A second row 308 includes identifier N2.S1, which points to two URLs (URL4 and URL5). A third row 308 includes identifier N1.S2, which points to two URLs (URL6 and URL7). When more than one URLs are used, the URLs are prioritized. In other words, the first URL may be attempted to be executed first, then the second, and so forth. In other examples, all URLs are executed.

It will be appreciated that the intermediate identifiers 302 of FIG. 3 are combinations of a namespace and a name. A namespace is a set of symbols or names that are used to organize items. A name may be included in the namespace. In the context of micro-services, "authentication" may be seen as a namespace (N1), and two types of authentication (S1 and S2) may be included in N1. Thus, N1.S1 and N1.S2 define particular micro-services that each perform specific types of authentication.

Figure 4:
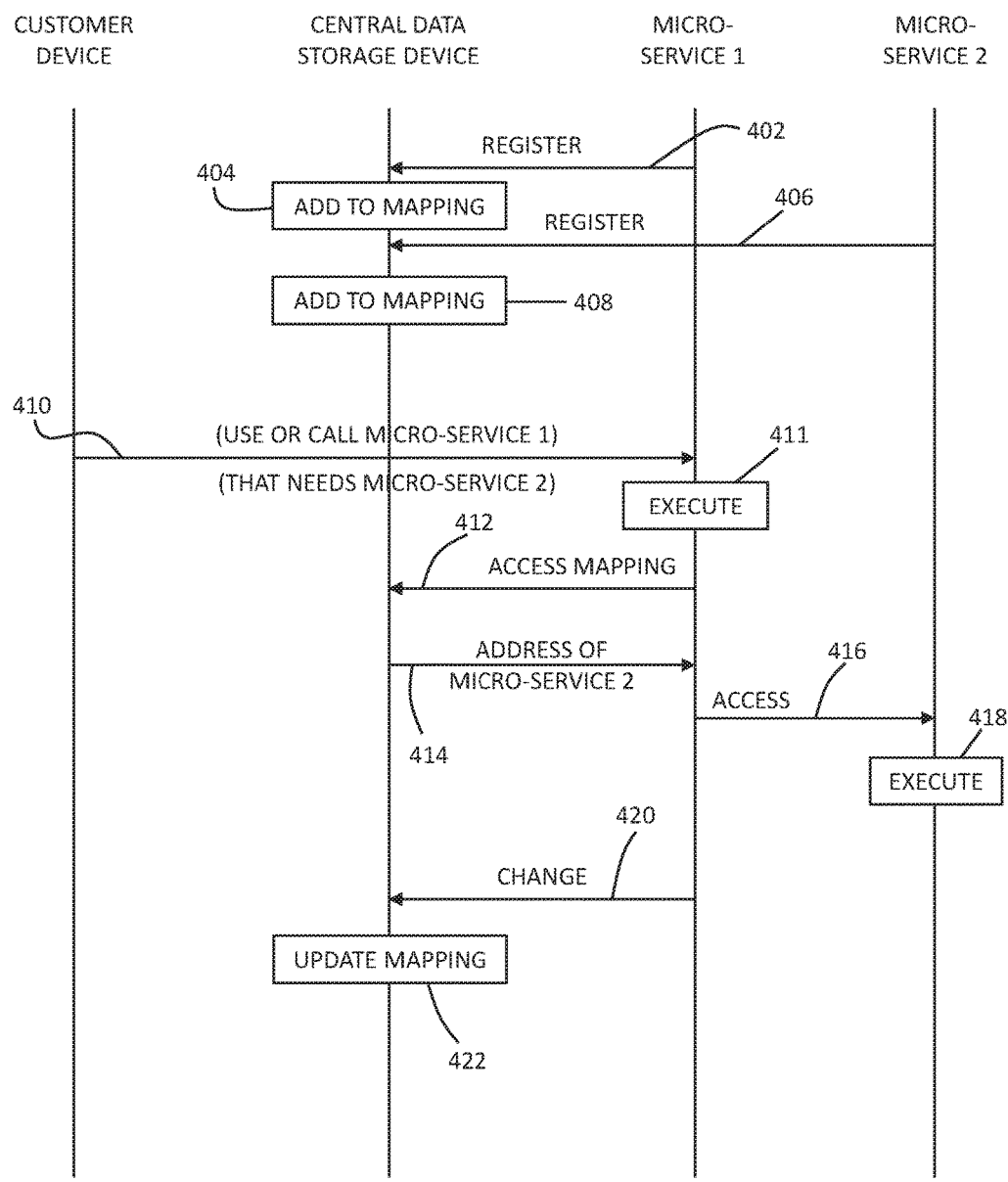
FIG. 4 comprises a call flow diagram showing information flow in a system for micro-service registration and resolution according to various embodiments of the present invention.

Referring now to FIG. 4, one example of the information flow in a system for micro-service registration and resolution is described. The example of FIG. 4 assumes a customer device that requests use of a first micro-service (micro-service 1). Micro-service 1 calls or utilizes a second micro-service (micro-service 2). A central data storage device includes a mapping that maps intermediate identifiers (corresponding to a micro-service) to physical addresses (and possibly other information). In aspects, the physical addresses are addresses of the servers that execute the micro-service. A calling program (or micro-service) executes a micro-service by applying or accessing this physical address.

At step 402, micro-service 1 registers with the central data storage device. Registration causes micro-service 1 to be mapped to the physical address of the server that executes micro-service 1 at step 404.

At step 406, micro-service 2 registers with the central data storage device. Registration causes micro-service 2 to be mapped to the physical address of the server that executes micro-service 2 at step 408.

At step 410, a use or call of micro-service 1 is made by the customer device. For example, the user at the customer device may click on a link at the device causing the execution of micro-service 1.

Micro-service 1 is executed at step 411. At step 412, micro-service 1 accesses the mapping because micro-service 1 calls micro-service 2. The address of micro-service 2 is sent to micro-service 1 at step 414. Micro-service 1 uses the address to access micro-service 2 at step 416. Micro-service 2 is then executed at step 418.

In other aspects, a change to the operational status of micro-service 1 occurs at step 420. This change is communicated from the server that executes micro-service 1 to the central data storage device. For example, the server that executes micro-service 1 may become disabled. Communication of the operation change (e.g., disablement of a server that executes a micro-service) may be made by a message sent from the source of the event (the server) to the location where the mapping is stored (e.g., the central storage device). At step 422, the mapping is updated. In examples, the address of the server that executes micro-service 1 may be removed from the mapping, or the priority of the server may be lowered, to mention two examples.

Figure 5:
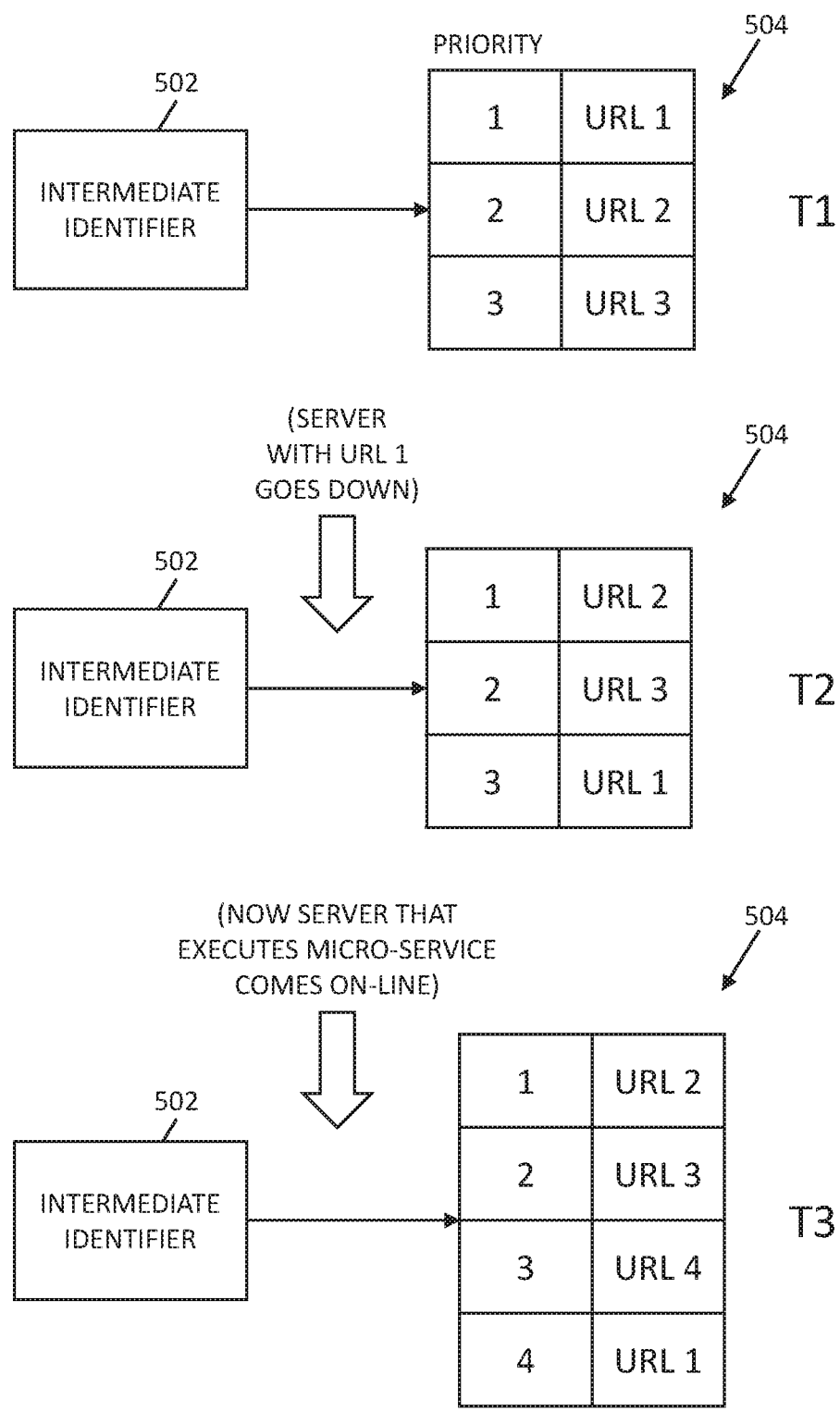
FIG. 5 comprises a block diagram of a dynamic mapping structure according to various embodiments of the present invention.

Referring now to FIG. 5, one example of a dynamic mapping structure is described. In this example, an intermediate identifier 502 points to a table 504 of micro-service addresses (e.g., URLs). These addresses are prioritized with 1 being the highest priority. In examples, the addresses with the highest priority may be used first. In other examples, all addresses are used in priority order. The contents and the order of the table 504 may change over time.

At time T1, the table has three URLs, ordered in priority from 1 to 3. The server with URL1 becomes disabled. Consequently, at time T2 the URL1 is moved to third priority and the other URLs are increased in priority. URL2 moves to first in priority, while URL3 moves to second in priority. The mapping is changed automatically as events occur.

At time T2, a new server that executes the micro-service comes on-line. This new server has a URL of URL4. At time T3, the new server is added as the server that is third in priority (URL1 of the disabled server remains last in priority). Execution then ends.

It will be appreciated by those skilled in the art that modifications to the foregoing embodiments may be made in various aspects. Other variations clearly would also work, and are within the scope and spirit of the invention. It is deemed that the spirit and scope of the invention encompasses such modifications and alterations to the embodiments herein as would be apparent to one of ordinary skill in the art and familiar with the teachings of the present application.

What is claimed is:

1. A method, comprising:
automatically registering a plurality of micro-services with a central data storage device, the registering including determining a mapping between intermediate identifiers that identify selected micro-services and physical addresses of one or more servers that execute the selected micro-services, wherein each intermediate identifier of the intermediate identifiers is one or more of a name or a name space and is not an address;

executing a first micro-service using computer code including a first instruction, the first micro-service programmatically calling a second micro-service in the computer code with the first instruction including an intermediate identifier, the intermediate identifier being of the form of an x.y pair wherein x represents a name and y represents a type of authentication, the intermediate identifier being a first x.y pair or a second x.y pair, wherein the first x.y pair and the second x. y pair are fixed and do not change, the first micro-service using the second micro-service and calling the second micro-service via the intermediate identifier that identifies the second micro-service;

wherein the first x.y pair maps to a first prioritized table and the second x.y pair maps to a second prioritized table;

wherein the first prioritized table comprises a first plurality of first URLs arranged in a ranked priority order, each of the first URLs being a server address of a different server;

wherein the second prioritized table comprises a second plurality of second URLs arranged in a ranked priority order, each of the second URLs being a server address of a different server;

wherein when a server associated with a URL becomes disabled a first message is sent to the central data storage device, and responsively the URL of the disabled server is reduced in priority or removed from one or more of the first prioritized table or the second prioritized table, and the ranked priority order of one or more of the first prioritized table or the second prioritized table is readjusted and wherein the computer code and the intermediate identifier in the first instruction remain unchanged;

wherein when a new server with a new URL that executes the new micro-service comes on line a second message is sent to the central data storage device, and responsively the new URL of the new server is added to one or more of the first prioritized table or the second prioritized table and the ranked priority order is readjusted and wherein the computer code and the intermediate identifier in the first instruction remain unchanged;

wherein the computer code is executed including the first instruction and a determination is made as to whether the first x.y pair is being used or the second x.y pair is being used;

wherein the second micro-service is executed from the computer code by mapping the first x.y to the first prioritized table when the first x.y is being used, or by mapping the second x.y pair to the second prioritized table when the second x.y pair is being used, and subsequently utilizing the highest priority URL obtained from the first prioritized table or from the second prioritized table.

2. The method of claim 1, wherein a customer device executes the first micro-service.

3. The method of claim 1, wherein the registering further includes mapping each of the intermediate identifiers to one or more of: a HTTP method, an input consumption by a selected micro-service, an output production by a selected micro-service, and a version number.

4. A system, comprising:
- a central data storage device;
- a plurality of servers executing a plurality of micro-services, wherein each of the servers executes a selected one of the plurality of micro-services, the plurality of servers being coupled to the central data storage device;
- wherein each of the plurality of micro-services registers with the central data storage device by determining a mapping between intermediate identifiers that identify selected ones of the micro-services and physical addresses of the servers, wherein each intermediate identifier of the intermediate identifiers is one or more of a name or a name space and is not an address;
- wherein a first micro-service is executed using computer code including a first instruction, the first micro-service programmatically calling a second micro-service in the computer code with the first instruction with an intermediate identifier, the intermediate identifier being of the form of an x.y pair wherein x represents a name and y represents a type of authentication, the intermediate identifier being a first x.y pair or a second x.y pair, wherein the first x.y pair and the second x. y pair are fixed and do not change, the first micro-service using the second micro-service and calling the second micro-service via the intermediate identifier that identifies the second micro-service;
- wherein the computer code is executed including the first instruction and a determination is made as to whether the first x.y pair is being used or the second x.y pair is being used;
- wherein the first prioritized table comprises a first plurality of first URLs arranged in a ranked priority order, each of the URLs being a server address of a different server;
- wherein the second prioritized table comprises a second plurality of second URLs arranged in a ranked priority order, each of the second URLs being a server address of a different server;
- wherein when a server associated with a URL becomes disabled a first message is sent to the central data storage device, and responsively the URL of the disabled server is reduced in priority or removed from one or more of the first prioritized table or the second prioritized table, and the ranked priority order of one or more of the first prioritized table or the second prioritized table is readjusted and wherein the computer code and the intermediate identifier in the first instruction remain unchanged;
- wherein when a new server with a new URL that executes the new micro-service comes on line a second message is sent to the central data storage device, and responsively the new URL of the new server is added to one or more of the first prioritized table or the second prioritized table and the ranked priority order is readjusted and wherein the computer code and the intermediate identifier in the first instruction remain unchanged;
- wherein the computer code is executed including the first instruction and a determination is made as to whether the first x.y pair is being used or the second x.y pair is being used;
- wherein the second micro-service is executed from the computer code by mapping the first x.y to the first prioritized table when the first x.y is being used, or by mapping the second x.y pair to the second prioritized table when the second x.y pair is being used, and subsequently utilizing the highest priority URL obtained from the first prioritized table or from the second prioritized table.

5. The system of claim 4, wherein a customer device requests execution of the first micro-service.

6. The system of claim 4, wherein the mapping further maps each of the intermediate identifiers to one or more of: a HTTP method, an input consumption by a selected micro-service, an output production by a selected micro-service, and a version number.

* * * * *